(12) United States Patent
Chen

(10) Patent No.: US 7,597,334 B2
(45) Date of Patent: Oct. 6, 2009

(54) SIDEWAYS MOVEMENT PROPELLED SCOOTER DEVICE

(76) Inventor: Shane Chen, 1821 NW. Eight Ave., Camas, WA (US) 98607

( * ) Notice: Subject to any disclaimer, the term of this patent is extended or adjusted under 35 U.S.C. 154(b) by 291 days.

(21) Appl. No.: 11/525,538

(22) Filed: Sep. 21, 2006

(65) Prior Publication Data

US 2007/0170686 A1 Jul. 26, 2007

Related U.S. Application Data

(60) Provisional application No. 60/760,638, filed on Jan. 21, 2006.

(51) Int. Cl.
*B62M 1/00* (2006.01)
(52) U.S. Cl. .................. 280/87.041; 280/87.01; 280/87.021; 280/87.03; 280/62
(58) Field of Classification Search ............ 280/87.041, 280/124.11, 124.111, 87.01, 87.03, 87.042, 280/62
See application file for complete search history.

(56) References Cited

U.S. PATENT DOCUMENTS

| 3,884,023 | A | * | 5/1975 | Robinson .................. 56/400.1 |
| 4,123,079 | A | * | 10/1978 | Biskup ................. 280/87.042 |
| 4,540,192 | A | | 9/1985 | Shelton |
| 5,039,121 | A | * | 8/1991 | Holter ....................... 280/220 |
| 6,908,090 | B2 | | 6/2005 | Chuang |
| 6,976,687 | B2 | | 12/2005 | Beleski, Jr. |
| 2002/0050695 | A1 | * | 5/2002 | Feng .................... 280/87.041 |
| 2002/0063406 | A1 | * | 5/2002 | Feng .................... 280/87.041 |
| 2005/0093261 | A1 | * | 5/2005 | Liao et al. ............. 280/87.041 |

* cited by examiner

*Primary Examiner*—Jeffrey J Restifo
*Assistant Examiner*—Bryan A Evans
(74) *Attorney, Agent, or Firm*—Steven J. Adamson

(57) ABSTRACT

A scooter device having a flexible, tiltable frame structure and biased direction rear wheels. The scooter may be of a type that achieves forward propelled by side-to-side movement of a user. The frame structure may include a flexible member or members and/or incorporate other flexible or moveable components to achieve desired performance. The frame structure and steering mechanism may be moveable into a more compact form for storage or transport. A brake arrangement and other features are also disclosed.

30 Claims, 5 Drawing Sheets

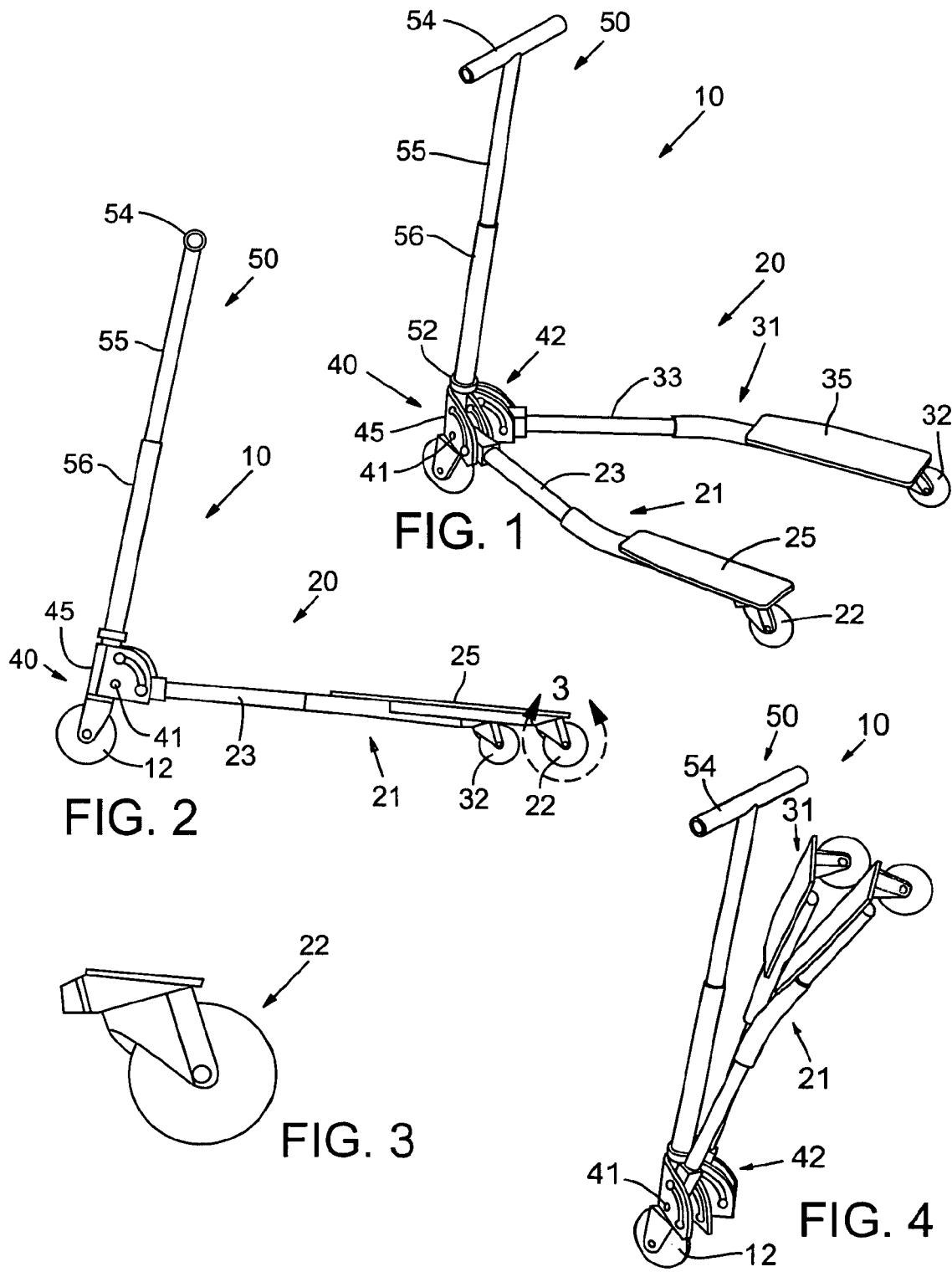

SIDEWAYS MOVEMENT PROPELLED SCOOTER DEVICE

CROSS REFERENCE TO RELATED APPLICATIONS

This application claims the benefit of U.S. Provisional Application No. 60/760,638, filed Jan. 21, 2006, and entitled Side Movement Propelled Wheeled Recreational Device and having the same inventor as above.

This application is related to U.S. patent application Ser. No. 11/656897, filed Jan. 22, 2007, entitled Side Movement Propelled Scooter Device Having Expanded Foot Platform and having the same inventor as above, which is hereby incorporated by reference as though included in its entirety.

FIELD OF THE INVENTION

The present invention relates to scooters and, more specifically, to those having three or more wheels and which may be propelled by sideways movement of the user.

BACKGROUND OF THE INVENTION

Various self-propelled and motorized scooters are known in the art. These include two wheeled, three wheeled and other multi-wheeled embodiments.

Known three wheeled scooter embodiments include those disclosed in: U.S. Pat. No. 4,540,192, issued to Shelton for a Three-Wheeled Scooter-Type Vehicle ('192 patent); U.S. Pat. No. 5,039,121, issued to Holter for a Tri-Skater ('121 patent); U.S. Pat. No. 6,908,090, issued to Chuang for a Cambering Vehicle Having Inclined Pivot Axle ('090 patent); and U.S. Pat. No. 6,976,687 for a Cambering Vehicle and Mechanism ('687 patent).

The '192 patent discloses a scooter having two rear wheel frame members, each with a foot placement area, that can be moved between a first adjacent position and a second spaced position. The two rear wheels are each mounted with a spring that biases them in the line of direction of their respective frame members. The biased arrangement also allows movement of the wheels out of this line of direction, while returning them in the absence of a displacement force. This arrangement permits forward movement of the scooter when the user shifts his or her weight from side to side.

The '121 patent discloses a similar device but with caster wheels that are coupled to the frame member at a point forward of the axle of the wheel. This arrangement has a similar effect to that of the '192 patent, effectively biasing the wheels in the line of direction of the frame member and permitting forward propulsion of the scooter device in response to side to side movement of the user.

The '090 patent discloses a scooter device that does not utilize spring biased or tilted caster wheels. The device of the '090 patent has a movable frame arrangement that permits the steering assembly and wheels to tilt slightly, in parallel, permitting a user to lean the scooter into a turn. In the '090 patent, the rear wheels are fixedly mounted in place and the frame is configured such that there is no independent movement of the position of the rear wheels.

The '687 patent discloses a scooter device that, similar to the '090 patent, does not utilize spring biased or tilted caster wheels. The device of the '687 patent uses a yoke and linkage arrangement that permits the steering mechanism and wheels to tilt in parallel, permitting a user to lean the scooter into a turn. In the '687 patent, the rear wheels are fixedly mounted in place and the frame is configured such that there is no independent movement of the position of the rear wheels.

The devices of the prior art are disadvantageous because they do not provide one or more of: tilting of the steering mechanism or foot platforms to improve turning or accentuate the riding experience; direction biased rear wheels; independent or lateral movement of the rear wheel support member to accentuate propulsion efforts; and a flexible structural element efficiently integrated into the frame of the scooter device, among other reasons. Prior art devices also lack adequate braking.

A need thus exists for a side-to-side movement propelled scooter device that has a frame structure that is flexible to support tilting and enhance the riding experience and/or propulsion effort. A need also exists for a scooter device that combines both tilted caster or otherwise direction biased wheels and a tiltable frame. A further need exists for improved braking in a scooter device.

SUMMARY OF THE INVENTION

Accordingly, it is an object of the present invention to provide a side-to-side movement propelled scooter device that overcomes the disadvantageous aspects of the prior art and provides movement of the foot placement areas.

It is another object of the present invention to provide such a scooter device that combines tilted caster or otherwise direction biased wheels with a tiltable steering mechanism.

It is yet another object of the present invention to provide such a scooter device that has a flexible structural element efficiently incorporated into its frame.

It is also an object of the present invention to provide such a scooter device with improved braking.

These and related objects of the present invention are achieved by use of a sideways movement propelled scooter device as described herein.

In one embodiment, the present invention may include at least a first forward located wheel; at least a second and a third rearward located wheel; a frame structure through which the first wheel is coupled to the second and third wheels; and a steering mechanism that has a vertically ascending control member and is coupled to the first wheel such that turning of the steering mechanism achieves a turning of the first wheel; wherein the frame structure includes a flexible structural member with shape memory that permits movement of the frame structure such that the vertically ascending control member may be moved laterally while the second and third wheels remain on the ground.

In another embodiment, the present invention may include at least a first forward located wheel; at least a second and a third rearward located wheel; a frame structure through which the first wheel is coupled to the second and third wheels, wherein the second and third rearward located wheels are mounted in a direction biased arrangement; and a steering mechanism that has a vertically ascending control member and is coupled to the first wheel such that turning of the steering mechanism achieves a turning of the first wheel; wherein said frame structure is configured such that the vertically ascending control member may tilt laterally while the second and third wheels remain on the ground.

In yet another embodiment, among others, the present invention may include at least a first forward located wheel; at least a second and a third rearward located wheel; a frame structure through which the first wheel is coupled to the second and third wheels, wherein the second and third rearward located wheels include are mounted in a direction biased arrangement; and a steering mechanism that has a vertically ascending control member and is coupled to the first wheel such that turning of the steering mechanism achieves a turning of the first wheel; wherein said frame structure includes a platform that is at least in part moveable by a user to initiate a braking of at least one of the second and third wheels.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 1-2 are a perspective view and a side elevation view of a flexible frame scooter device in accordance with the present invention.

FIG. 3 illustrates a rear wheel mounted in a forward tilted caster arrangement of the scooter device of FIGS. 1-2.

FIG. 4 illustrates the device of FIG. 1 with the frame arms folded upwardly to form a compacted device position.

DETAILED DESCRIPTION

Figure 5:
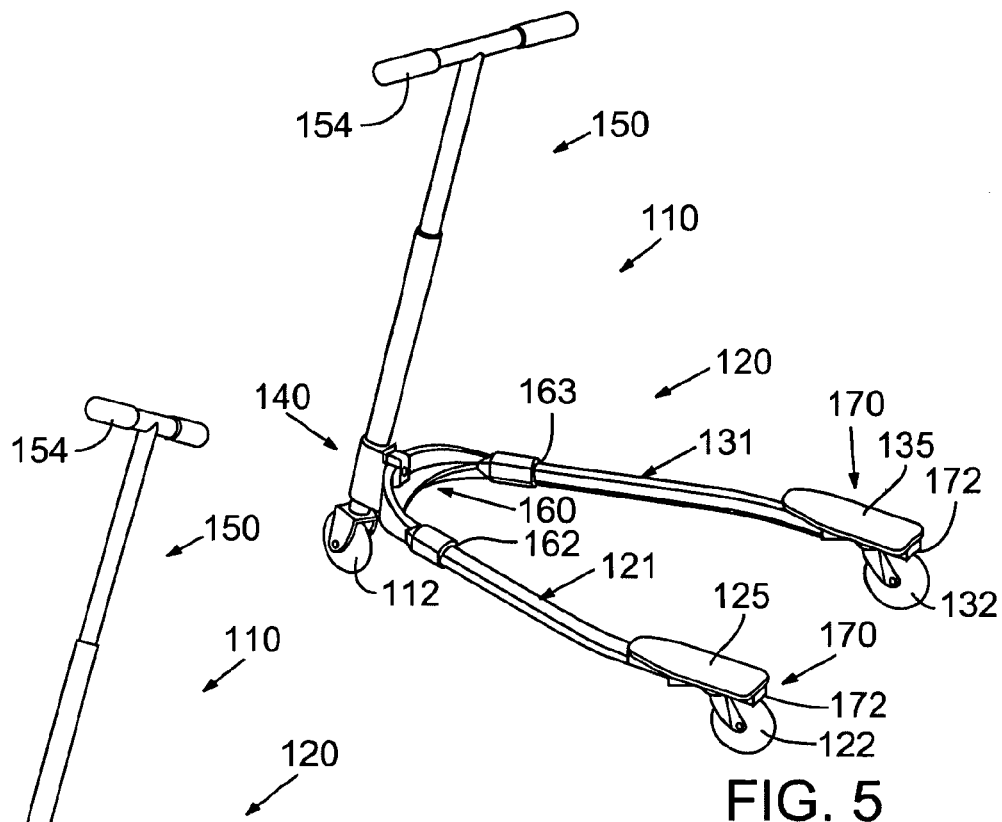
FIGS. 5-6 are a perspective view and a side elevation view of another embodiment of a flexible frame scooter device in accordance with the present invention.

Referring to FIGS. 1-2, a perspective view and a side elevation view of a flexible frame scooter device 10 in accordance with the present invention are respectively shown. This scooter device 10 may include a frame structure 20 that is coupled to a steering mechanism 50 and supports at least a front wheel 12 and at least two rear wheels 22,32. Frame structure 20 may include a joint structure 40 from which first and second frame arms 21,31 extend. The frame arms may be pivotally coupled (as shown in FIGS. 1-3) through pivots 41,42 or fixedly coupled or otherwise coupled.

Joint structure 40 may also include a cylindrical shell 45 or the like through which shaft 52 of steering mechanism 50 may extend. Steering shaft 52 may couple to wheel 12 on one end and to handlebar 54 at its other end. It may include multiple (telescoping or otherwise configured) sections 55,56 and a height adjustment mechanism (not shown but known in the art).

Frame arms 21,31 may each include a flexible section 23,33 and foot placement platforms 25,35 that are provided proximate wheels 22,32, respectively. Flexible sections 23,33 introduce flexible movement into the device, permitting a user to move (or lean) the steering mechanism relative to the frame structure and also permitting movement of foot platforms 25,35 both inwardly and outwardly relative to one another and rotationally along the frame arm. This arrangement provides many benefits including, but not limited to, permitting a user to lean the steering mechanism (advantageous when leaning into a turn), move the frame arms more robustly (enhancing propulsion), and rotate the foot placement platforms (better contact and control when propelling the device and/or negotiating a turn, etc.).

FIG. 3 illustrates rear wheel 22 (or 32) mounted in a forward tilted caster arrangement. This arrangement achieves a wheel that is capable of turning via rotation about its mounting shaft, yet which self-returns to the line of direction at which it is mounted. The tilted caster arrangement achieves a biased direction because the wheel is biased to align with the direction it is tilted. Such a wheel arrangement is taught in the '121 patent. Other direction biased wheel arrangements include those incorporating a spring or other mechanical or physical direction biased mechanism. A spring based direction biased wheel arrangement is taught by the '192 patent. The '121 patent and the '192 patent are incorporated by reference herein.

FIG. 4 illustrates device 10 with frame arms 21,31 pivoted upwardly towards handlebar 54, achieving a more compact arrangement for transport or stowage, etc.

Figure 6:
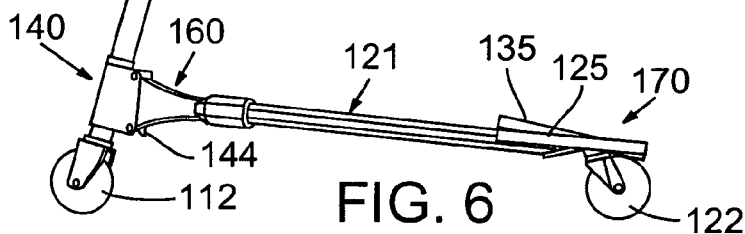

Referring to FIGS. 5-6, a perspective view and a side elevation view of another embodiment of a flexible frame scooter device 110 in accordance with the present invention are respectively shown. Device 110 may include at least a front wheel 112 and two rear wheels 122,132 coupled to a frame structure 120. A steering mechanism 150 is preferably coupled through joint structure 140 at the front end of the device and the frame structure preferably includes frame arms 121,131 on which foot placement platforms 125,135 are respectively formed.

In the device 110 of FIGS. 5-6, the frame structure may include a substantially U-shaped or V-shaped flexible mounting member ("U-shaped member") 160 that is made of a strong, yet -flexible material that is resilient and has self-returning properties (similar to that of device 10 of FIGS. 1-2).

Figure 7:
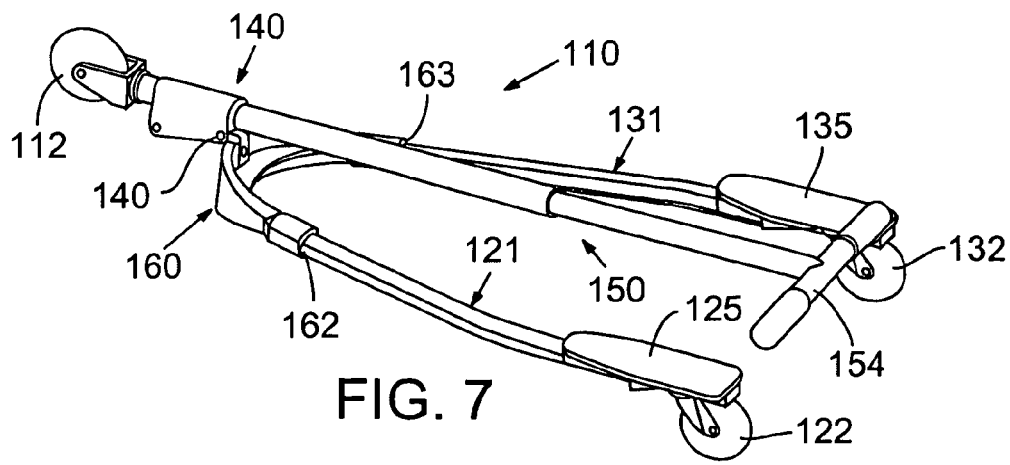
FIG. 7 illustrates the device of FIG. 5 with the steering mechanism folded downwardly to form a compacted device position.

U-shaped member 160 may be fixedly or pivotally mounted through joint structure 140. FIGS. 6-7 illustrate connection through pivot 141 and actuation by a release or the like 144. U-shaped member 160 may include frame arm mounting members 162,163 into which frame arms 121,131 are secured. The mounting members may be formed in a complementary manner to receive frame arms 121,131. The U-shaped member is preferably made of polyurethane, fiberglass or another suitable material.

FIGS. 5-7 also illustrates a braking mechanism 170. Braking mechanism 170 may include the fashioning the foot placement platforms 125,135 such that they are movably mounted, pivotally or otherwise, to the frame structure such that the weight of a user leaning back on the platforms causing the bottom of the platforms to descend into contact with its corresponding wheel. A brake pad or wedge 172 can be provided on the underside of the movable platform. This pad is preferably replaceable so that it may be replace in response to wear.

In FIG. 6, brake 170 of foot platform 135 is shown pivoted downward into contact with wheel 132 (obscured from view by wheel 122).

FIG. 7 illustrates device 110 with the steering mechanism 150 uncoupled at release 144 and pivoted downwardly at pivot 141 onto frame arms 121,131 to form a more compact arrangement.

Figure 8:
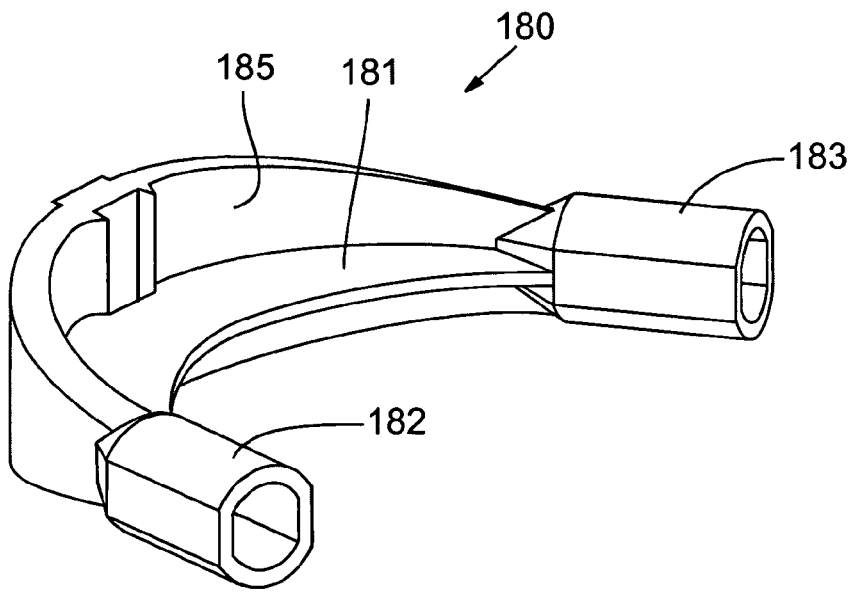
FIG. 8 is a perspective view of another embodiment of a U-shaped flexible frame member in accordance with the present invention.

FIG. 8 is a perspective view of another embodiment of a U-shaped frame member in accordance with the present invention. U-shaped frame member is similar to U-shaped frame member 160 of FIGS. 5-7 yet preferably includes a reinforcing band or section 181 that may extend between the complementary mounting members 182,183 (similar to mounting members 162,163) and be formed integrally with those members and/or U-shaped wall or body 185. If reinforcing section 181 is not provided a reinforcing crossbar or the like may be provided between the frame arms 121,131.

Figure 9:
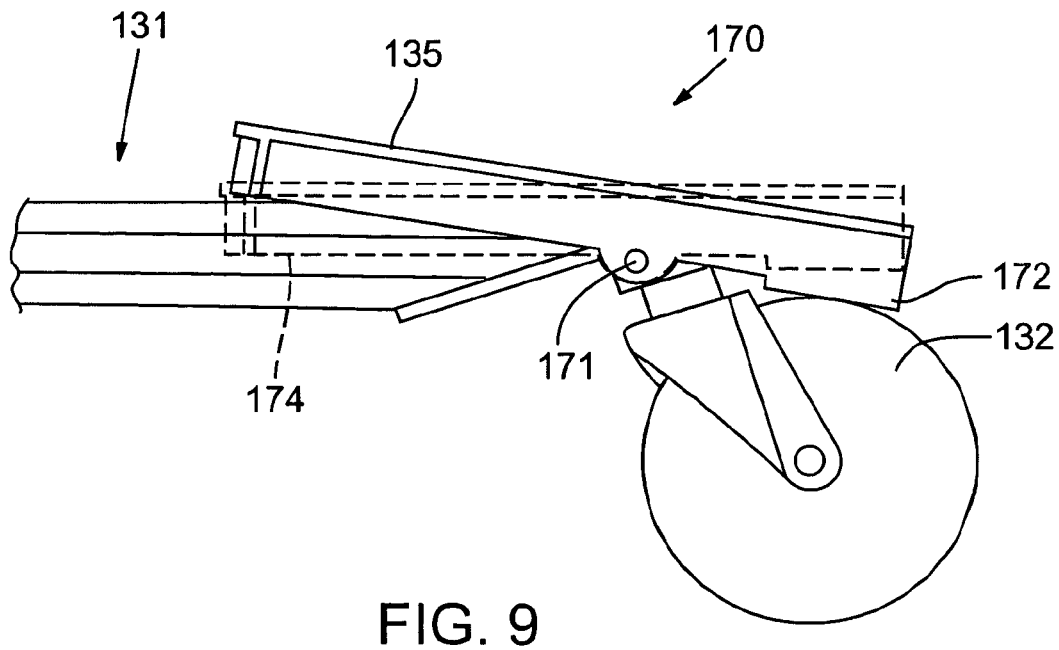
FIG. 9 is a side view of a braking mechanism for a scooter device in accordance with the present invention.

FIG. 9 is a side view of one embodiment of a braking mechanism 170 in accordance with the present invention. FIG. 9 illustrates the end of frame arm 131 (or 21, 31, 121, or other) that has a recess 174 shaped complementary to platform 135 formed therein. Frame arm 131 may have a pivot 171 coupled thereto through which platform 135 is coupled to the support arm. When a user leans backwards (or downward on the back end of the platform), brake pad 172 comes into contact with wheel 132 acting to brake or slow rotation of that wheel. Leaning evenly on both platforms (21,31 or 121,131) slows the scooter while maintaining substantially a straight line of direction. Leaning more heavily on one platform may achieve a turning of the scooter device.

Figure 10:
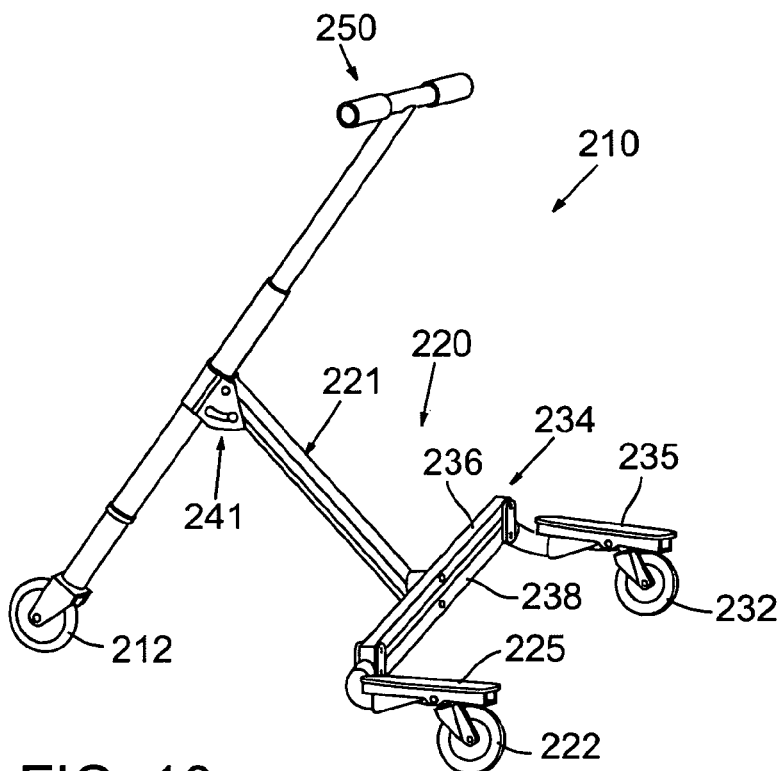
FIGS. 10-11 are a side perspective and a rear perspective view of another embodiment of a scooter device in accordance with the present invention.
Figure 11:
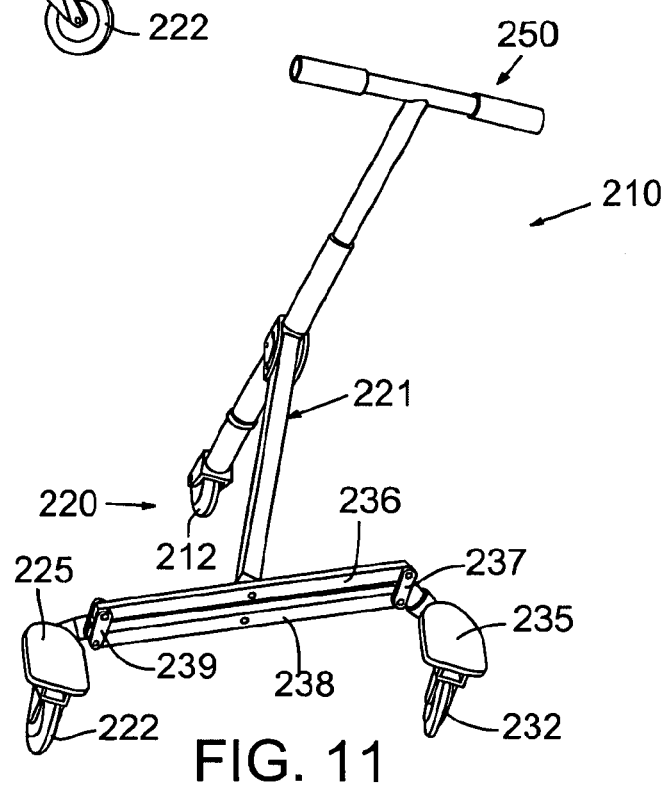

FIGS. 10-11 are a side perspective and a rear perspective view of another embodiment of a scooter device 210 in accordance with the present invention. Scooter device 210 may possess many of the features of device 10 or 110 including a front wheel 212 and a pair of rear wheels 222,232, a steering mechanism 250, a frame structure 220, and two foot placement platforms 225,235 that may incorporate a brake mechanism 270 (similar to brake mechanism 170).

Frame structure 220 may include a principal support arm 221 that is coupled to the steering mechanism 250 at a point higher than that of designs 10 and 110. The frame coupling may be adjustable through an adjustable pivot 241 permitting a user to adjust the distance of the foot platforms from the steering mechanism.

Frame structure 220 may also include a parallelogram or like assembly 234, possessing top and bottom members 236, 238 and side members 237,239. The top and bottom members move substantially parallel and relative to one another. The platforms may be coupled to the side members 237,239, respectively. The lateral tilting of the steering mechanism 250 to one side causes the top member 236 to move in that direction more than the bottom member 238, which in turn causes the side members 237,239 to tilt in a like direction, causing the platforms 225,235 and wheels 222,232 to tilt in that direction, and vice versa.

Figure 12:
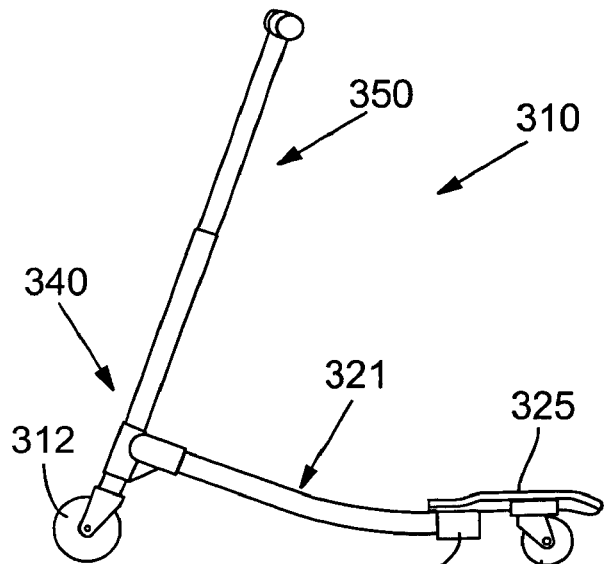
FIGS. 12-13 are a side elevation and a rear perspective view of another embodiment of a scooter device 310 in accordance with the present invention is shown.
Figure 13:
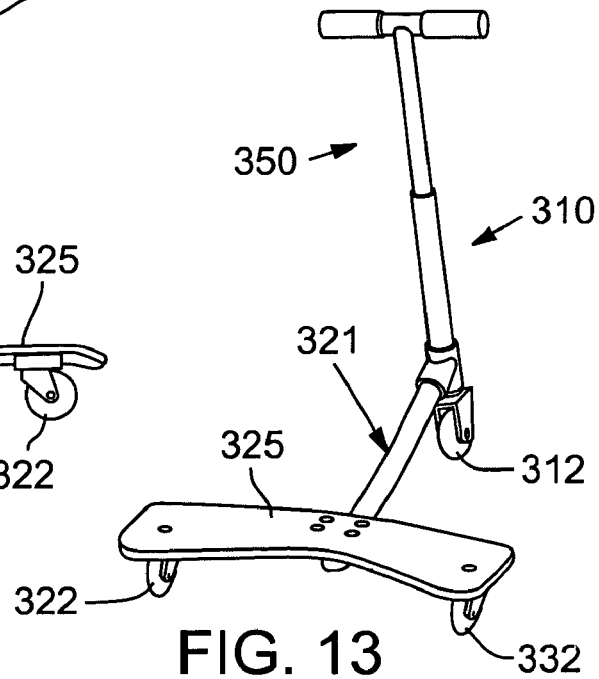

Referring to FIGS. 12-13, a side elevation view and a rear perspective view of another embodiment of a scooter device 310 in accordance with the present invention is shown. Scooter device 310 may include at least a front wheel 312 and two rear wheels 322,332 coupled to a frame structure 320. The frame structure may include a singular (or otherwise configured) substantially longitudinally disposed support arm 321 that is coupled on one end to a steering mechanism 350 and the other end to a user platform 325. The coupling to steering mechanism 350 may be through a joint structure 340. Rear wheels 322,332 are preferable direction biased.

Support arm 221 may be formed in whole or in part of a rigid yet flexible material (elastic properties), such as fiberglass or flexible metal or polyurethane or the like that permits the steering mechanism to move relative to the platform, for example, permitting a user to lean the steering mechanism into a curve.

Alternatively, support arm 321 may be coupled to platform 325 (or to steering mechanism 350) through a biased cam 338 or the like that permits movement of the support arm relative to the platform. The biased cam permits movement in response to a displacement force, but returns to an initial position in the absence of the displacement stress. Since the support arm is coupled to the steering mechanism, a biased cam or like arrangement permits the steering mechanism to tilt relative to the user platform, permitting, for example, a user to lean the steering mechanism into a turn, etc.

Figure 14:
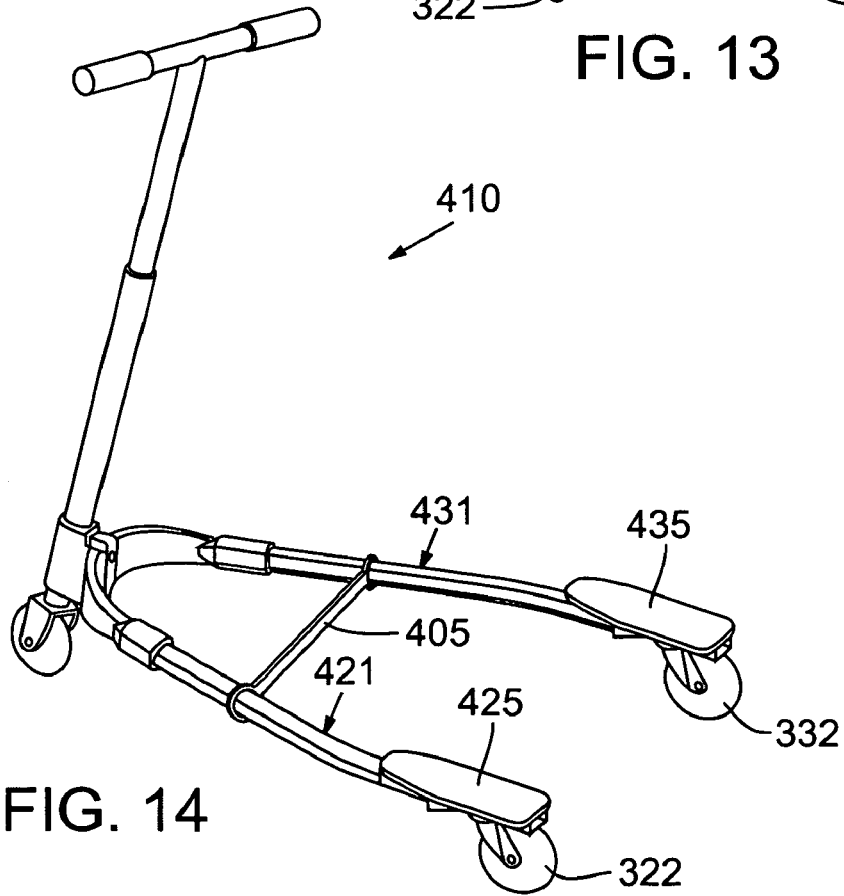
FIG. 14 is a perspective view of an embodiment of a scooter device having a cross-member in accordance with the present invention.

Referring to FIG. 14, a perspective view of an embodiment of a scooter device 410 having a cross-member 405 in accordance with the present invention is shown. Cross-member 405 may be mounted to support arms 421,431 and is preferably made of a durable material that may be flexible or rigid.

As the cross-member is slid backwards, the two support arms are pulled closer to one another causing the platforms 425,435 to similarly be pulled closer to one another. In this manner, the platforms may be maintained at a closer distance, perhaps more advantageous to a younger or smaller rider.

In addition, cross-member adds support and stability permitting the U-shaped frame member 160 (of FIG. 8) to be made without the reinforcing structure 181.

With respect to materials, the rigid frame members/structures are preferably formed of aluminum, other metals, or alloys thereof, or any other suitable rigid, durable and lightweight material. The flexible frame member(s) may be formed of fiberglass, polyurethane, flexible metals or other suitable material.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A scooter device propelled by side to side movement of a user, comprising:
   at least a first forward located wheel;
   at least a second and a third rearward located wheel;
   a frame structure through which the first wheel is coupled to the second and third wheels; and
   a steering mechanism that has a vertically ascending control member and is coupled to the first wheel such that turning of the steering mechanism achieves a turning of the first wheel;
   wherein the frame structure includes a flexible structural member with shape memory that permits movement of the frame structure such that the vertically ascending control member may be moved laterally while the second and third wheels remain on the ground;
   wherein the frame structure includes a first frame arm extending rearwardly from the steering mechanism to the second wheel and a second frame arm extending rearwardly from the steering mechanism to the third wheel, and wherein the first and second frame arms are attached to the flexible structural member;
   wherein the flexible structural member includes a first mounting member extending substantially in the direction of the first frame arm and attaching thereto and a second mounting member extending substantially in the direction of the second frame arm and attaching thereto; and
   wherein the flexible structural member is capable of flexing in three mutually orthogonal directions; the flexible structural member is substantially singular and extends from the first mounting member to the second mounting member.

2. The scooter device of claim 1, wherein the second and third rearward located wheels are mounted in a biased direction wheel arrangement.

3. The scooter device of claim 1, wherein the flexible structural member is substantially singular and has a shape ranging from U-shaped to V-shaped, the singular flexible structural member extending from the first mounting member to the second mounting member.

4. The scooter device of claim 2, wherein the biased direction wheel arrangement includes a tilted caster wheel arrangement.

5. The scooter device of claim 2, wherein the flexible material includes at least one of fiberglass, flexible metal and polyurethane.

6. The scooter device of claim 1, wherein the frame structure includes a first foot placement section associated with the second wheel and a second foot placement section associated with the third wheel, and the first, and second frame arms are capable of being moved up-and-down and in-and-out relative to one another.

7. The scooter device of claim 3, wherein the vertically ascending member is coupled to the flexible structural member between, the first mounting member and the second mounting member, and the second and third wheels tilt substantially in the same direction as the vertically ascending member due, at least in part, to the flexibility conferred by the flexible structural member.

8. The scooter device of claim 1, wherein the frame structure is at least in part movable towards the vertically ascending member to form a more compact arrangement for transport or storage.

9. The scooter device of claim 1, wherein the frame structure includes a platform that is at least in part movable by a user to initiate a braking of at least one of the second and third wheels.

10. The scooter device of claim 1, further comprising a cross-member capable of movement forward and backward along the frame arms to thereby adjust the distance between the frame arms, the inward and outward movement of the frame arms being imparted by the elasticity of the flexible structural member.

11. A scooter device propelled by side to side movement of user, comprising:
 at least a first forward located wheel;
 at least a second and a third rearward located wheel;
 a frame structure through which the first wheel is coupled to the second and third wheels, wherein the second and third rearward located wheels are mounted in a biased direction arrangement; and
 a steering mechanism that has a vertically ascending control member and is coupled to the first wheel such that turning of the steering mechanism achieves a turning of the first wheel;
 wherein the frame structure is configured such that the vertically ascending control member may tilt laterally while the second and third wheels remain on the ground; and
 wherein the frame structure includes a substantially singular flexible structural member with shape memory that is coupled at a first mount to a support arm coupled to the second wheel and at a second mount to a support arm coupled to the third wheel, the singular flexible structural member being continuous from the first mount to the second mount, the flexible structural member is capable of flexing in three mutually orthogonal directions.

12. The scooter device of claim 11, wherein the frame structure includes a first foot placement platform provided proximate the second wheel and a second foot placement platform provided proximate the third wheel, and wherein the frame structure is configured such that the foot placement platforms are tiltable.

13. The scooter device of claim 12, wherein the frame structure includes a first frame arm extending rearwardly from the steering mechanism to the first foot placement platform and a second frame arm extending rearwardly from the steering mechanism to the second foot placement platform, and wherein the first and second frame arms are flexibly attached in the frame structure in a manner that achieves up-and-down and in-and-out movement of the arms relative to one another.

14. The scooter device of claim 11, wherein the flexible material includes at least one of fiberglass, flexible metal and polyurethane.

15. The scooter device of claim 13, wherein the frame structure is at least in part movable towards the vertically ascending member to form a more compact arrangement for transport or storage.

16. The scooter device of claim 11, wherein the vertically ascending member is coupled to the singular flexible structural member between the first and second mounts and the frame structure is configured such that the second and third wheels tilt substantially in the same direction as the vertically ascending member.

17. The scooter device of claim 13, further comprising a cross-member capable of movement forward and backward along the frame arms to thereby adjust the distance between the frame arms.

18. The scooter device of claim 12, wherein the frame structure includes a first frame, arm extending rearwardly from the steering mechanism to a first foot placement platform, a second frame arm extending rearwardly from the steering mechanism to a second foot placement platform, and a cross-member capable of movement forward and backward along the frame arms to thereby adjust the distance between the first and second foot placement platforms.

19. A scooter device propelled by side to side movement of a user, comprising:
 at least a first forward located wheel;
 at least a second and a third rearward located wheel;
 a frame structure through which the first wheel is coupled to the second and third wheels; and
 a steering mechanism coupled to the first wheel such that turning of the steering mechanism achieves a turning of the first wheel;
 wherein the frame structure includes a first support arm coupled to the second wheel and a second support arm coupled to the third wheel and is configured such that the first and second support arms may move independently of one another during use, the independent movement including up-and-down and in-and-out movement relative to one another; and
 wherein the frame structure includes a substantially singular flexible structural member with shape memory that is coupled at a first mount to a support arm coupled to the second wheel and at a second mount to a support arm coupled to the third wheel, the singular flexible structural member being continuous from the first mount to the second mount, the flexible structural member is capable of flexing in three mutually orthogonal directions.

20. The scooter device of claim 19, wherein the frame structure includes a substantially singular flexible frame member that imparts the relative movement to the support arms.

21. The scooter device of claim 19, wherein the second and third rearward located wheels include at least one of the wheel arrangements including a tilted caster arrangement and a spring-biased direction arrangement.

22. The scooter device of claim 19, wherein the substantially singular flexible frame member has a shape ranging from square-U to curved-U to V-shaped.

23. A scooter device propelled by side to side movement of user, comprising:
    at least a first forward located wheel;
    at least a second and a third rearward located wheel;
    a frame structure through which the first wheel is coupled to the second and third wheels, wherein the second and third rearward located wheels are mounted in a biased direction arrangement;
    a steering mechanism that has a vertically ascending control member and is coupled to the first wheel such that turning of the steering mechanism achieves a turning of the first wheel; and
    a first and a second foot placement platform respectively associated with the second and third wheels;
    wherein the frame structure is configured such that the vertically ascending control member may tilt laterally, and the first and second foot placement platforms tilt in substantially the same direction as the vertically ascending member;
    wherein the frame structure includes a substantially singular flexible structural member, a first frame arm and a second frame arm, the first frame arm extending rearwardly from the flexible structural member to the second wheel and a second frame arm extending rearwardly from the flexible structural member to the third wheel the flexible member being continuous from the first arm to the second arm; and
    wherein, in use, the flexible structural member is flexible in three mutually orthogonal directions.

24. The scooter device of claim 22, wherein the vertically ascending member is coupled to the flexible frame member and the flexibility of the flexible frame member permits that vertically ascending member to tilt and also permits the second and third wheels to tilt substantially in the same direction as the vertically ascending member.

25. The scooter device of claim 23, wherein the frame structure is configured such that the vertically ascending member and the first and second foot placement platforms tilt substantially in parallel.

26. A scooter device propelled by side to side movement of user, comprising:
    at least a first forward located wheel;
    at least a second and a third rearward located wheel;
    a frame, structure through which the first wheel is coupled to the second and third wheels, wherein the second and third rearward located wheels are mounted in a biased direction arrangement; and
    a steering mechanism that has a vertically ascending control member and is coupled to the first wheel such that turning of the steering mechanism achieves a turning of the first wheel;
    wherein the frame structure includes a platform that is at least in part movable by a user to initiate a braking of at least, one of the second and third wheels; and
    wherein the frame structure includes a substantially singular flexible frame member that has a shape ranging from U-shaped to V-shaped and is flexible in three mutually orthogonal, directions, and
    a first frame arm and a second frame arm, the first frame arm extending rearwardly from the flexible structural member to the second wheel and a second frame arm extending rearwardly from the flexible structural member to the third wheel, wherein the flexible structural member is continuous from the first arm to the second arm.

27. The scooter device of claim 26, wherein the movable part of the platform is configured with movement into a position that initiates braking by contact with the one of the second and third wheels.

28. The scooter device of claim 27, wherein the platform includes at least a first platform section provided proximate that second wheel and a second platform section provided proximate that third wheel, and both of the platform sections are at least in part movable to initiate braking of their corresponding wheel.

29. The scooter device of claim 26, wherein the movable part of the platform is pivotally provided in the frame structure so that pressure on the platform by a user causes a portion of the part to move into contact with the corresponding one of the second and third wheels to cause a braking of the movement of that wheel.

30. A scooter device propelled by side to side movement of user, comprising:
    at least a first forward located wheel;
    at least a second and a third rearward located wheel;
    a frame structure through which the first wheel is coupled to the second and third wheels, wherein the second and third rearward located wheels are mounted in a biased direction arrangement; and
    a steering mechanism that has a vertically ascending control member and is coupled to the first wheel such that turning of the steering mechanism achieves a turning of the first wheel;
    wherein the frame structure is at least in part movable towards the vertically ascending member to form a more compact arrangement for transport or storage; and
    wherein the frame structure includes a substantially singular flexible frame member that is flexible in three mutually orthogonal directions, and
    a first frame arm and a second frame arm, the first frame arm extending rearwardly from the flexible structural member to the second wheel and a second frame arm extending rearwardly from the flexible structural member to the third wheel, wherein, the flexible structural member is continuous from the first arm to the second arm.

* * * * *